Jan. 31, 1956 H. KELLNER 2,732,596

DRAUGHT PREVENTERS FOR WINDOWS, DOORS, AND THE LIKE

Filed July 5, 1951

Inventor:
Heinrich Kellner

United States Patent Office 2,732,596
Patented Jan. 31, 1956

2,732,596

DRAUGHT PREVENTERS FOR WINDOWS, DOORS, AND THE LIKE

Heinrich Kellner, Bernkastel-Kues, Germany

Application July 5, 1951, Serial No. 235,134

1 Claim. (Cl. 20—69)

The invention relates to draught preventers for windows, doors, and the like, especially in dwelling rooms.

For prevention of draughts in dwelling rooms which enter through fissures or gaps at the edges of doors and windows, it has been proposed to stuff such gaps with packings of felt, rubber, and the like. Such draught preventers suffer from the disadvantage that after being used for a certain amount of time they remain compressed and no longer fill the gaps between the respective parts. Further disadvantages of the known draught preventers result upon their being applied either loose or by nailing.

In the first case the packing is likely to alter its position, and in the second case the frames of the doors and the windows are damaged by nailing.

The disadvantages of the hitherto known draught preventers are avoided according to the invention by applying a packing of elastic material which has been given the form of a hollow tube of very small wall thickness together with a fastening strip fixed along the tube and prepared as an adhesive strip. The small wall thickness of the tube and of the fastening strip is of special importance since in a compressed state the packing must not hinder the closing of the engaging parts of the doors and windows, which hindrance often occurred with the hitherto known packings. The hollow tube is so elastic that it easily fits into uneven surfaces, and always reassumes its original form. By means of the fastening strip combined with the hollow tube the packing can be easily applied to gaps in doors or windows.

According to the invention the packing is made of highly elastic plastics, rubber, or the like, and the adhesive strip is impregnated with a permanent adhesive, the packing material being chemically resistant to the adhesive.

The fastening strip can consist completely of adhesive material or be provided with an adhesive layer. For better adhesive action, the fastening strip is arranged tangentially to the outer circumference of the hollow tube. It may extend tangentially on both sides of the hollow tube, or on one side only.

The novel features which are considered as characteristic for the invention are set forth in particular in the appended claim. The invention itself, however, both as to its construction and its method of operation, together with additional objects and advantages thereof, will be best understood from the following description of specific embodiments when read in connection with the accompanying drawings, in which:

Figs. 5 to 10 show cross-sections of parts of doors and windows with their frames to illustrate the modes of application of the draught preventers.

Fig. 1 shows a door, warped with respect to its frame R, so that the corners of the door gape and cannot be tightly closed.

Figure 1:
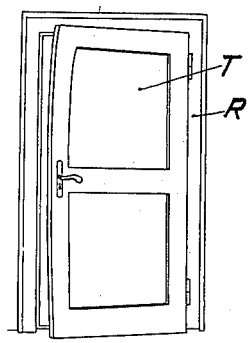
Fig. 1 is a perspective view of a door twisted out of the true.
Figure 2:
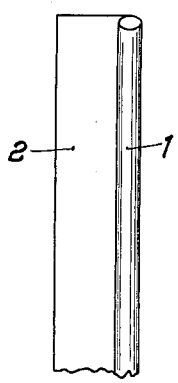
Figs. 2 to 5 show different modifications of the draught preventer.
Figure 3:
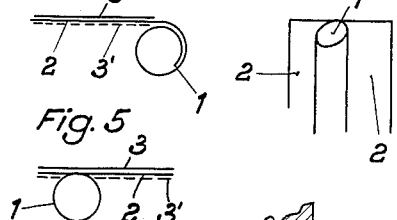
Figure 4:
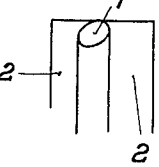
Figure 5:
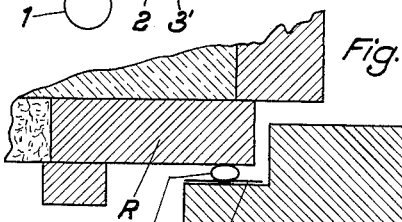

The resulting gap has to be filled with a suitable packing. A packing according to the invention consists of a tube 1 having a wall thickness of about 0.2 to 0.5 mm. A fastening strip 2 is connected to the tube 1 so that its plane is tangential to the circumference of the tube. The fastening strip 2 consists of adhesive material or is covered with an adhesive layer 3. The hollow tube 1 and the fastening strip 2 consist of highly elastic material so that owing to the small wall thickness they easily fit into all uneven surfaces which are to be stuffed. The adhesive of the strip 3 is a permanent adhesive which facilitates the fastening of the packing to the frames of the door or windows. The cross-section of the packing can be so chosen that the fastening strip is either one sided, as shown in Figs. 2 and 3, or extends to both sides of the hollow tube 1 as shown in Figs. 4 and 5. The fastening strip can be provided with adhesive on its upper or lower side as indicated in Figs. 3 and 5 by the reference numerals 3 or 3', respectively, or on both sides.

Figure 6:
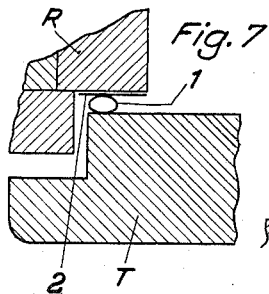
Figures 7, 8:
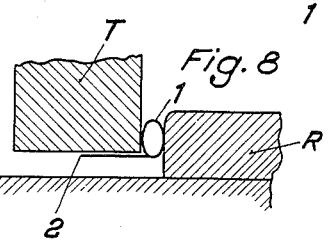

The packing can be arbitrarily applied. In the arrangement shown in Fig. 6, a packing according to Figs. 4 and 5 is applied to a door T. In the arrangement of Fig. 8 a packing according to Figs. 2 and 3 is applied and fastened to a door T in such a way that it is bent around the corner of the door T.

Figures 9, 10:
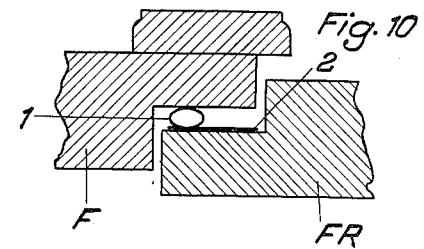

Figs. 9 and 10 show the application of the packing to a casement F or to a window frame FR, respectively.

It will be understood that each of the elements described above, or two or more together, may also find a useful application in other types of packing differing from the types described above.

While the invention has been illustrated and described as embodied in draught preventers for windows, doors and the like, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claim.

What is claimed as new and desired to be secured by Letters Patent is:

A sealing strip comprising, in combination, an elongated tubular portion made of a resilient material; an elongated flat strip portion having opposite faces and being coextensive with said tubular portion, one of said faces being substantially tangent to and in intimate contact with the outer surface of said tubular portion; and permanent adhesive means on the other face of said strip portion for securing the same together with said tubular portion to a surface, whereby the sealing strip may be positioned relative to and adhered to a surface, without the intermediary of extraneous adhesive means, in such a manner that another surface may engage and compress said tubular portion, the latter thereby sealing the space between said surfaces.

References Cited in the file of this patent

UNITED STATES PATENTS

| | | |
|---|---|---|
| 1,580,071 | Naramore | Apr. 6, 1926 |
| 1,702,217 | Miller | Feb. 12, 1929 |
| 1,705,486 | Lang | Mar. 19, 1929 |
| 2,180,177 | Ternstrom | Nov. 14, 1939 |
| 2,315,366 | Daley et al. | Mar. 30, 1943 |
| 2,401,624 | Petter et al. | June 4, 1946 |
| 2,433,937 | Tornberg | Jan. 6, 1948 |
| 2,538,406 | Allen | Jan. 16, 1951 |
| 2,544,044 | Reber et al. | Mar. 6, 1951 |
| 2,608,728 | Montgomery | Sept. 2, 1952 |
| 2,661,229 | Slaughter | Dec. 1, 1953 |

FOREIGN PATENTS

| | | |
|---|---|---|
| 536,350 | Great Britain | Jan. 30, 1941 |